United States Patent Office 3,426,690
Patented Feb. 11, 1969

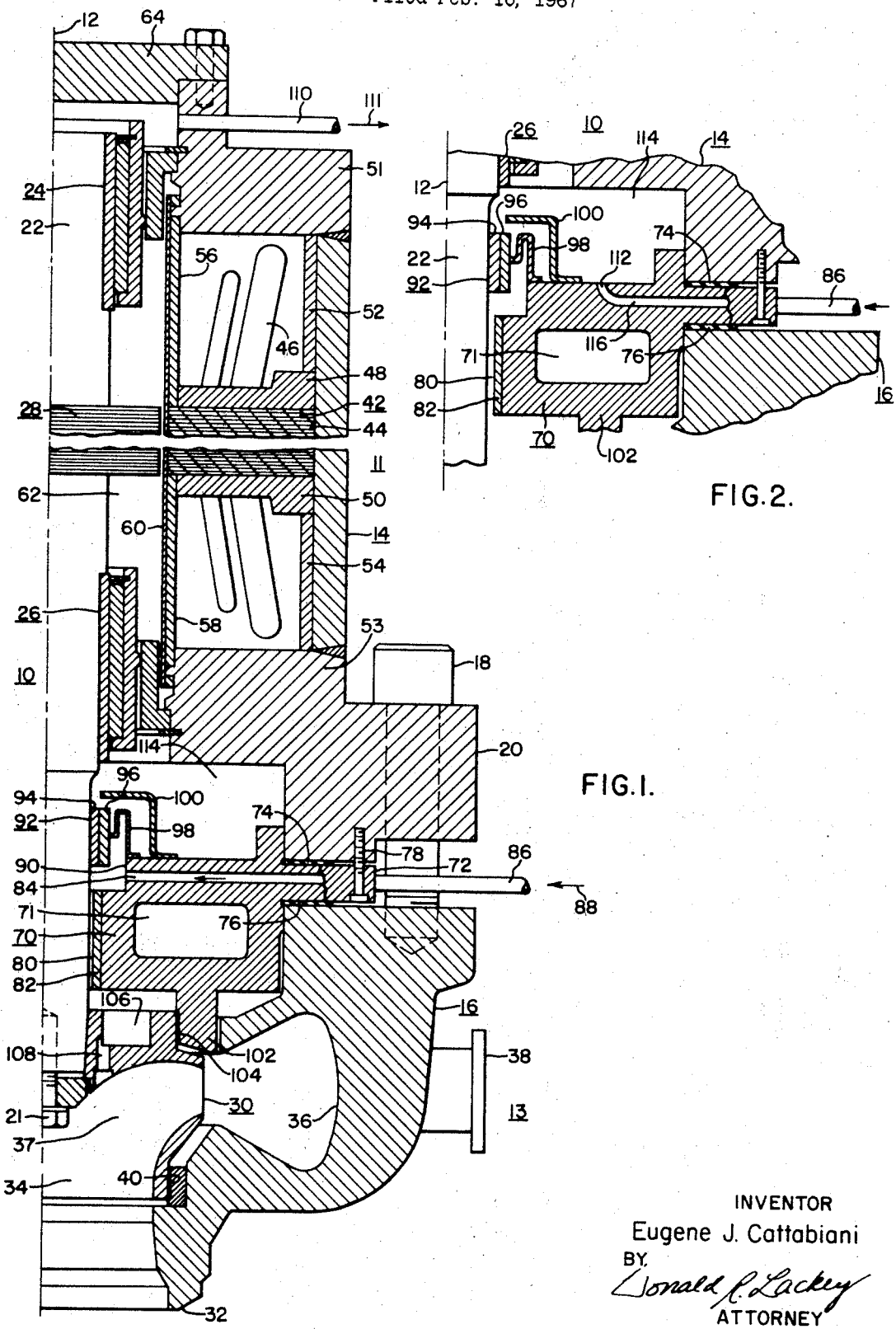

3,426,690
MOTOR-PUMP UNIT
Eugene J. Cattabiani, Export, Pa., assignor to Westinghouse Electric Corporation, Pittsburgh, Pa., a corporation of Pennsylvania
Filed Feb. 16, 1967, Ser. No. 616,582
U.S. Cl. 103—87                          14 Claims
Int. Cl. F04d 13/06, 29/08; H02k 5/12

ABSTRACT OF THE DISCLOSURE

A motor-pump unit for pumping fluids and slurries having elevated temperatures, in which the housings of the motor and pump are connected and sealed to form a common housing structure. The rotor and stator of the motor are in hermetically sealed enclosures, and the volute of the pump is separated from the motor by a thermal and slurry barrier which restricts the flow of heat from the heated fluids into the motor, and prevents leakage of the fluids into the motor.

---

Sealed motor-pump units for pumping fluids at elevated temperatures commonly contain a thermal barrier disposed between the pump volute and the motor. The purpose of the thermal barrier is to restrict heat flow from fluids being pumped, into the motor section of the unit, and to prevent the hot fluid from leaking into the motor section. Leakage of the hot fluids into the motor section cause overheating of the motor, and when the fluids are carrying abrasive particles in suspension, they may cause bearing failures, erosion, and interfere with the cooling flow paths in the motor.

In the prior art, the thermal barrier is bolted to the unit housing, with the inside diameter of the barrier forming a labyrinth type seal with the unit driving shaft. Purge water is supplied on the motor side of the labyrinth seal, to provide a pressure differential across the seal which prevents the hot fluids or slurries from entering the motor cavity. This structure, however, has proven to be inadequate. The temperature difference across the labyrinth seal, formed between the driving shaft and the thermal barrier, creates a leakage in both directions through the seal, even when purge water is flowing. Thus, the hot fluids or slurries, under the influence of this thermal leakage, work their way into the motor cavity, causing bearing failure and cooling problems.

Further, in certain applications for sealed motor-pump units, such as in a boiler installation, there are several system operating modes that result in too low a pressure at the eye of the pump. This, in turn, may result in a negative pressure in the motor, causing air to be drawn into the rotor cavity. This situation is undesirable, as the air interferes with the cooling of the bearings and may quickly cause bearing failure.

Accordingly, it is an object of the invention to provide a new and improved motor-pump unit of the sealed type.

Another object of the invention is provide a new and improved sealed motor-pump unit which includes a more effective thermal and slurry barrier between the motor and pump sections.

Still another object of the invention is to provide a new and improved motor-pump unit which includes structure associated with the motor-pump housing which provides an effective slurry barrier between the motor and pump sections.

A further object of the invention is to provide an improved thermal and slurry barrier between integral, sealed motor and pump sections, which restricts the flow of heat from hot fluids in the pump to the motor section, and which effectively seals the pump section from the motor section to prevent the pumped fluids from leaking into the motor section.

Another object of the invention is to provide a new and improved motor-pump unit which maintains positive pressure in the motor section, even when the pressure at the pump eye drops below normal operating values.

Briefly, the present invention accomplishes the above cited objects by providing a motor-pump unit of the sealed type, in which the thermal and slurry barrier is clamped between the motor housing and pump casing. The barrier cooperates with means adapted to introduce a supply of purging fluid into the sealed motor-pump unit, through the thermal barrier. The inner diameter of the barrier forms a straight cylindrical running fit with the driving shaft, with the clearance between the barrier and shaft being sufficient to allow a film of purge water to be forced therethrough in the direction of the pump.

A close fitting, wear resistant sleeve is disposed about the shaft, near the portion of the barrier which is axially adjacent the motor end of the motor-pump unit. The sleeve is flexably mounted to the barrier, in order to prevent its acting as a bearing. Since the sleeve has a very small clearance to the shaft, and since there is substantially no temperature or pressure differential across the sleeve, it creates a highly effective seal. Thermal shielding means is disposed about the sleeve to prevent sudden changes in the temperature of the fluid in the motor cavity from causing the sleeve to contract and bind on the shaft.

Further objects and advantages of the invention will become apparent from the following detailed description, taken in connection with the accompanying drawings, in which:

FIG. 1 is an elevational view, in section, of a motor-pump unit constructed according to the teachings of the invention; and FIG. 2 is a fragmentary view illustrating a modification of the motor-pump unit shown in FIG. 1, which may be utilized for certain applications.

Referring now to FIG. 1, the exemplary form of the invention illustrated therein comprises a motor-pump unit 10. The motor-pump unit 10 is symmetrical about centerline 12, and therefore, only one side of the motor-pump unit 10 is illustrated.

The motor-pump unit 10 includes a motor section 11, which is commonly a squirrel-cage motor having a rotor 28 and stator 42 disposed within a housing 14, and a pump section 13, which includes an impeller 30 disposed within a casing 16. The motor housing 14 and pump casing 16 are held in assembled fixed relation by mounting bolts, such as bolt 18, which may cooperate with a flanged mounting portion 20 of motor housing 14 and a suitable facing surface of the pump casing 16. A driving shaft 22 is mounted for rotation within the motor housing 14 on a pair of radial bearing arrangements 24 and 26. A thrust bearing (not shown) may be disposed adjacent the lower radial bearing assembly 26. The radial bearings 24 and 26, and thrust bearing, may be constructed according to the teachings of U.S. Patent 2,972,309, issued Feb. 21, 1961, which is assigned to the same assignee as the present application, or any other suitable bearing construction may be used. The rotor 28 of the motor portion 11 is secured to the driving shaft 22 intermediate the radial bearings 24 and 26, adjacent the stator 42. The lower end of the driving shaft 22, as shown in the figure, extends downwardly into the pump casing 16, with the impeller 30 of pump section 13 being secured thereto, such as by mounting bolt 21, for rotation within the pump casing 16.

The pump impeller 30 has a plurality of vanes 37 arranged to draw fluid through intake port 32, into the eye 34 of the impeller 30, and into a spiral discharge passage or volute 36, from which the fluid exits through outlet port 38. A labyrinth seal 40 is formed on the pump casing 16 adjacent the eye 34 of the impeller 30, to limit high pressure fluid in the volute 36 from flowing back into the intake port 32.

The motor stator 42, commonly called the stator cartridge, is a generally tubular structure, which includes a core 44 provided with electrical windings shown generally at 46. The stator 42 is hermetically sealed, in a manner well known in the art, by the housing 14, which includes upper and lower ends 51 and 53, respectively, stator end rings 48 and 50, spacing cylinders 52 and 54, back-up rings or cylinders 56 and 58, and the stator "can" or enclosure 60, which is generally formed of stainless steel, or other corrosion resistant material.

The rotor 28, and rotor cavity 62 is sealed within the stator cartridge 32 by the upper closure member 64 and the thermal and slurry barrier 70.

Barrier 70, in forming the lower seal to the rotor cavity, must accomplish this function without danger of galling the shaft and its own structural members, it must provide a thermal barrier between the hot fluids being pumped through the pump section 13, and the motor section 11, and it must provide a highly effective seal, as the fluid being pumped must not leak into the rotor cavity. Many pumping applications require the pumping of hot, caustic fluids which contain finely divided abrasive particles. Leakage of this fluid into the rotor cavity will cause the motor to overheat, and the particles will quickly cause erosion and bearing failure, as well as interfering with the cooling of the motor. The teachings of this invention are particularly applicable to such difficult pumping applications, because of the highly efficient barrier 70, which seals the rotor cavity against leakage from the pump section 13.

Barrier 70 has a cavity 71, which is hermetically sealed, and which greatly reduces the heat flow from the hot fluids passing through the pump section 13, to the motor section 11.

Barrier 70 also includes a circumferential flanged portion 72, which extends radially outward from the barrier. This flanged portion 72 is disposed between and fixedly clamped by the mounting flange 20 of the motor housing 14, and the pump casing 16. Gasket members 74 and 76 are disposed between the mounting flange 20 and barrier flange 72, and between the barrier flange 72 and pump casing 16, respectively, to prevent the fluid in the volute 36 from leaking externally, and also past the mounting connection of the barrier to the motor-pump housing structure. Bolt 78 is for assembly purposes only, as gasket members 74 and 76 are fully loaded by the clamping force provided by the main mounting bolts, such as bolt 18.

Barrier 70 has a smooth, straight, cylindrical inner surface 80, spaced from driving shaft 22, to provide a straight cylindrical running fit, with a clearance slightly in excess of that which would be necessary with a labyrinth seal. A labyrinth seal is made unnecessary by forming the inner surface 80 from a cylindrical liner member 82 which is harder and more wear resistant than the remaining portion of the thermal barrier 70. For example, the liner member 82 may be formed of a ceramic, or a carbide material. The wear resistant liner 82 protects the barrier member 70, which is usually formed of stainless steel, from galling.

In cooperation with the cylindrical running fit, purging fluid, such as water is forced downwardly through the radial clearance between shaft 22 and surface 80, in the direction of the pump unit 13. The purge water, instead of being introduced above the barrier adjacent the motor section of the motor-pump unit 10, is brought radially through the barrier itself, which arrangement is facilitated by the circumferential flange of barrier 70, which is accessible from the outside surface of the motor-pump unit 10. Thus, barrier 70 defines at least one radial opening 84, which extends outwardly from its inner surface through flange 72, with the opening being in communication with a suitable conduit 86 at its outer access point. Purge water, under a predetermined pressure, flows into conduit 86, as shown by arrow 88, through the radial opening 84 in the thermal barrier 70, and downwardly between shaft 24 and surface 80. The higher pressure on the motor side of the running fit insures that the purging water will flow towards the pump section 13, without thermal leakage of the heated fluids or slurries into the rotor cavity. Barrier 70 may have a radial step 90 therein which increases its internal diameter adjacent the portion of the barrier which faces the motor section 11. Step 90 forms a header for the purge water which is being forced through the running fit. The radial opening 84 in the barrier is disposed to extend from the inner surface of step 90 radially outward through the flanged portion 72.

In addition to the cylindrical running fit between the shaft 22 and barrier 70, a limited leakage seal 92 is formed between shaft 22 and the barrier member 70, which completes the header for the purge water, formed partially by step 90. Seal 92 is formed by a liner or sleeve member 94, disposed about shaft 22 in a close fitting manner. Sleeve 92 has a smooth, straight cylindrical inner diameter, and is formed of a hard, wear resistant material, such as one of the ceramics or carbides, and it may be attached to a back-up member 96. In order to prevent sleeve member 92 from acting as an additional bearing, or otherwise being overloaded by radial forces, it is flexibly attached to the end of barrier member 70 which is disposed adjacent the motor section 11, by any suitable means, such as a bellows type member 98. Thus, sleeve member 94 "floats" on the shaft, and is free to move, due to its flexible mount, without seizure or galling. The clearance between the shaft 22 and the internal diameter of sleeve member 94 should only be great enough to prevent seizure during the maximum radial temperature difference which will occur between the sleeve and shaft for all operating conditions. In order to prevent this maximum radial temperature from being excessive, and thus permit as small a radial clearance as practical, sleeve member 94 is shielded with a relatively thin thermal shielding member 100, which protects the sleeve from sudden changes in the temperature of the rotor cavity fluid, such as water. Sudden temperature changes in the rotor cavity fluid may occur at startup, after a hot standby. Thermal shield 100 is fixedly attached to barrier 70, and is shaped to extend outwardly from barrier member 70, substantially parallel with the major axis 12 of the motor-pump unit 10, until it clears the end of sleeve member 94, and then it extends inwardly toward the shaft, stopping with enough clearance from the shaft to prevent contact therewith.

The close mounting of sleeve member 94 relative to shaft 22, and the negligible temperature and pressure differential axially across the sleeve member, creates a very effective seal, insuring that the majority of the purging fluid will be forced through the running fit, instead of upwardly into the rotor cavity. Sleeve member 94 is maintained at a temperature close to the temperature of the cavity fluid by the purge fluid, which thus minimizes the difference in temperature across its length. The pressure differential across sleeve 96 is small because the pressure of the purge fluid is only slightly above the pressure in the rotor cavity.

Thus, the purging fluid, such as water, is introduced intermediate the location of the seal provided by the shaft and sleeve member 94, and the running fit provided by the inner surface 80 of the cylindrical liner member 82, which forces the purging fluid to flow in a thin film along the shaft toward pump section 13, and preclude leakage of the pumped fluid into the rotor cavity 62.

Barrier 70 has also a downwardly extending projection 102 which forms a labyrinth type seal 104 between the impeller 30 and barrier 70, which allows a seepage flow for pressure equalizing purposes. Suctional cavity 106 and port 108, located in the impeller 30, counteract the normal downward thrust of the impeller during operation of the motor-pump unit 10.

In the operation of the motor-pump unit 10, the rotor cavity 62 is filed with a bearing lubricating fluid, which should preferably be the same fluid that is introduced through conduit 86 and through the barrier 70 for purging purposes, as small amounts of the purging fluid will leak past the seal provided by the tubular sleeve member 94. In most cases the purging fluid, as well as the fluid disposed within the rotor cavity, will be water. The small amount of leakage of the purging fluid into the rotor cavity 62 may be drawn therefrom through conduit 110, as illustrated by arrow 111. Conduit 110 may be disposed in communication with the rotor cavity 62, such as through the upper end portion 51 of the motor housing. The motor section 11 may be cooled by suitable heat exchanger means wrapped around the housing 14, in a manner well known in the art.

FIG. 2 is a fragmentary view of the motor-pump unit 10 shown in FIG. 1, which illustrates an embodiment of the invention which may be used on sealed motor-pump units applied to boiler installations. Certain operating modes of a boiler result in a low pressure in the eye 34 of the pump 13. This low pressure at the eye 34, coupled with the pressure drop from the thermal barrier 70 to the bearing 24 of the motor 11, may result in a negative pressure at conduit 110. Conduit 110, however, must be open, as when the pressure drops at the eye 34, air is pumped through the pump, along with the liquid being pumped. Thus, conduit 110 serves to exit the air which finds its way from the pump 13 into the motor section 11. Failure to remove this air from the motor will interfere with the cooling of the bearings, resulting in bearing damage and failure.

The basic motor-pump construction shown in FIG. 1, with the change shown in FIG. 2, will solve this problem, preventing the motor section 11 from dropping below atmospheric pressure. More specifically, on boiler installations, instead of introducing the purging fluid seal 92 and the cylindrical running fit, motor-pump unit 10 is modified to introduce high pressure purging fluid on the motor side of the thermal barrier 70, and, thus, on the motor side of seal 92. This may be accomplished, as shown in FIG. 2, by introducing the purging fluid through conduit 86, and into an opening 116 in thermal barrier 70 which exits into cavity 114 at 112, instead of into the space between seal 92 and the cylindrical running fit. In prior art constructions, purge fluid introduced on the motor side of the thermal barrier goes into the system without building up the pressure in the rotor cavity, due to the large clearance between the shaft and the labyrinth seal. The disclosed construction, due to the low clearance seal 92, allows the purging fluid to pressurize the motor cavity, thus preventing air from being drawn into the motor 11 through conduit 110.

In summary, there has been disclosed a new and improved motor-pump unit of the sealed type, which may pump fluids and slurries at elevated temperatures without danger of leakage of the heated fluids into the motor cavity. The new and improved thermal and slurry barrier construction restricts heat flow from the hot fluids in the pump volute, and it provides a very effective seal between the motor and pump sections by a running fit through which purging fluid is forced, in the direction from the motor side of the barrier 70 to the pump side, and by a flexibly mounted shaft seal disposed between the barrier 70 and the motor section 11. The purging fluid is brought into the motor-pump unit 10 through the thermal barrier 70, with the flexibly mounted shaft seal 92 directing the incoming fluid through the running fit and into the pump unit 13.

There has also been disclosed a new and improved motor-pump construction which may be used on those applications where the pressure at the pump eye may drop to a point which causes negative pressure in the motor section. In this embodiment of the invention, the purging fluid is introduced on the motor side of the thermal barrier, and the flexibly mounted shaft seal builds up the pressure in the motor section, and precludes the motor section from operating at negative pressure.

Since numerous changes may be made in the above-described apparatus and different embodiments of the invention may be made without departing from the spirit thereof, it is intended that all matter contained in the foregoing description or shown in the accompanying drawings, shall be interpreted as illustrative, and not in a limiting sense.

I claim as my invention:

1. A motor-pump unit comprising
   a motor section including a hollow motor housing and stator cartridge,
   a pump section including a hollow pump casing,
   a thermal barrier disposed between said motor and pump sections,
   a rotor and shaft disposed within said stator cartridge, with one end of the shaft extending through said thermal barrier into said pump casing,
   a pump impeller mounted on said one end of said shaft,
   said thermal barrier having a straight cylindrical inner surface disposed in predetermined spaced relation with said shaft, to form a straight cylindrical running fit,
   a tubular sleeve member disposed in predetermined spaced relation about said shaft to form a limited leakage seal, said tubular sleeve member being axially adjacent the portion of said thermal barrier which faces said motor section, and
   means flexibly mounting said tubular sleeve member to said thermal barrier.

2. The motor-pump unit of claim 1 including means adapted to introduce a purging fluid into the motor-pump unit.

3. The motor-pump unit of claim 2 wherein said means is adapted to introduce the purging fluid adjacent the motor side of said tubular sleeve member.

4. The motor-pump unit of claim 2 wherein said means is adapted to introduce the purging fluid axially between said tubular sleeve member and said thermal barrier.

5. The motor-pump unit of claim 1 wherein said thermal barier defines at least one opening adapted to introduce a purging fluid into the motor-pump unit on the motor side of said tubular sleeve member.

6. The motor-pump unit of claim 1 wherein said thermal barrier defines at least one radial opening adapted to introduce a purging fluid into the motor-pump unit between said tubular sleeve member and said thermal barrier, with the flow path for the purging fluid including the straight cylindrical running fit, which prevents fluids flowing through said pump section from leaking into said motor section.

7. The motor-pump unit of claim 6 wherein said thermal barrier includes a radially extending flanged portion which is clamped between said motor housing and said pump casing, said at least one radial opening defined by said thermal barrier extending through said radially extending flanged portion.

8. The motor-pump unit of claim 1 including a thermal shield which is mounted on said thermal barrier, and which extends outwardly therefrom to at least partially enclose said tubular sleeve member, said thermal shield protecting said tubular sleeve member from sudden changes in the temperature of any fluid disposed within said motor housing.

9. The motor-pump unit of claim 1 wherein the inner cylindrical surface of said thermal barrier is formed by a liner member, which is more resistant to wear than the remaining portion of said thermal barrier.

10. A thermal barrier for use with a motor-pump unit including a motor housing having a rotor, shaft, and stator mounted therein, a pump casing having an impeller mounted therein on an extension of said shaft, and means for clamping said housing and casing together; said thermal barrier being disposable between said housing and casing, and including an outwardly extending flange portion insertable between said housing and casing for supporting said thermal barrier, said thermal barrier having a straight, cylindrical inner surface disposable about the shaft in predetermined spaced relation therewith, for forming a running fit, said thermal barrier having a shaft seal flexibly mounted thereto, which includes a tubular sleeve member having a smooth inner surface disposable about the shaft adjacent the motor side of the thermal barrier, and a thermal shield mounted on the thermal barrier which extends outwardly therefrom to at least partially enclose said sleeve member, and shield said sleeve member from sudden temperature changes in any fluid disposed within the motor housing.

11. The thermal barrier of claim 10 wherein its inner surface is formed by a liner member which is more resistant to wear than the remaining portion of the thermal barrier.

12. The thermal barrier of claim 10 wherein the inside surface of said sleeve member is straight and cylindrical, having a diameter which will effectively seal the shaft without binding at the maximum radial temperature differential between the shaft and said sleeve member.

13. The thermal barrier of claim 10 wherein it defines at least one opening adapted for directing purging fluid to a predetermined location.

14. The thermal barrier of claim 10 wherein it defines at least one radial opening which extends from its inner surface to its outer periphery through its outwardly extending flanged portion, said opening being adapted for directing purging fluid through said thermal barrier and through the running fit between the thermal barrier and shaft.

References Cited

UNITED STATES PATENTS 2,913,989  11/1959  Boardman et al.

FOREIGN PATENTS 633,041  12/1961  Canada.

DONLEY J. STOCKING, *Primary Examiner.*

U.S. Cl. X.R.

103—111; 310—88